US006349685B1

(12) United States Patent
Kolmanovsky et al.

(10) Patent No.: US 6,349,685 B1
(45) Date of Patent: Feb. 26, 2002

(54) METHOD AND SYSTEM FOR OPERATING VALVES OF A CAMLESS INTERNAL COMBUSTION ENGINE

(75) Inventors: Ilya Vladimir Kolmanovsky, Ypsilanti; Mohammad Haghgooie, Ann Arbor; Mazen Hammoud, Dearborn; Michiel Jacques van Nieuwstadt, Ann Arbor, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/566,717

(22) Filed: May 9, 2000

(51) Int. Cl.[7] .................................................. F01L 9/04
(52) U.S. Cl. ................ 123/90.11; 123/90.15; 251/129.02; 73/116; 73/117.3
(58) Field of Search ............... 123/90.11, 90.12, 123/90.13, 90.14, 90.15; 73/116, 117.3

(56) References Cited

U.S. PATENT DOCUMENTS

| | | | |
|---|---|---|---|
| 4,794,890 A | | 1/1989 | Richeson, Jr. |
| 5,329,956 A | | 7/1994 | Marriott et al. |
| 5,392,642 A | * | 2/1995 | Tao ............................ 73/117.3 |
| 5,419,301 A | | 5/1995 | Schechter |
| 5,524,484 A | | 6/1996 | Sullivan |
| 5,797,360 A | * | 8/1998 | Pischinger ............... 123/90.11 |
| 6,167,852 B1 | * | 1/2001 | Kamimaru ............... 123/90.11 |
| 6,176,208 B1 | * | 1/2001 | Tsuzuki ................... 123/90.11 |

FOREIGN PATENT DOCUMENTS

| | | |
|---|---|---|
| EP | 0 663 552 A1 | 7/1995 |
| EP | 0 489 596 B1 | 12/1995 |
| JP | 09060514 | 3/1997 |
| JP | 02291411 | 12/1999 |

* cited by examiner

Primary Examiner—Thomas Denion
Assistant Examiner—Jaime Corrigan
(74) Attorney, Agent, or Firm—Carlos L. Hanze

(57) ABSTRACT

A method of operating one or more valves of a camless internal combustion engine via electronically controlled valve actuators includes the steps of measuring noise related to valve operation, deriving a control signal based at least in part on the measured noise, and applying the valve control signal to one or more of the valve actuators to reduce the effects of noise attributable to valve operation.

23 Claims, 5 Drawing Sheets

METHOD AND SYSTEM FOR OPERATING VALVES OF A CAMLESS INTERNAL COMBUSTION ENGINE

FIELD OF THE INVENTION

The present invention relates in general to a method and system for operating a camless internal combustion engine. More particularly, the invention relates to a method and system for reducing noise vibration and harshness (NVH) resulting from the operation of intake and exhaust valves in a camless internal combustion engine.

BACKGROUND OF THE INVENTION

Camless internal combustion engines are well known in the art and are used primarily to provide variability in valve timing, duration and lift. Because valve operation is not dependent on fixed valve timing, duration and lift, such engines can be optimized by varying any or all of these parameters to achieve optimal engine performance. Valves in conventional camless engines are typically actuated using electromechanical or electrohydraulic actuators. Electromechanical actuators use solenoids to generate a magnetic field to attract an armature which in turn actuates one or more corresponding valves and electrohydraulic actuators utilize fluid pressure, controlled by solenoids, to operate one or more corresponding valves. The opening and closing of the valves is typically a function of one or more engine parameters such as speed, demanded engine torque or crankshaft angular position.

Conventional camless engines having electromechanically or electrohydraulically actuated valves, such as described in U.S. Pat. No. 4,794,890 to Richeson and U.S. Pat. No. 5,419,301 to Schechter, however are often susceptible to undesirable noise vibration and harshness (NVH) caused by the contacting or "slamming" of actuator components against each other and the contacting of valve components against corresponding valve seats. This condition occurs because the high valve opening velocities required for gas exchange often result in excessive, non-zero "seating" velocities as the valve components contact each other or corresponding valve seats. To complicate matters, accurate velocity control of valve components is often very difficult due to system susceptibilities caused by operating conditions, component degradation and variability of control schemes and devices used to operate the valves.

Known methods for monitoring and controlling seating velocity involve using expensive sensors such as laser interferometers. Such sensors are used to directly measure seating velocity and derive current versus velocity and voltage versus velocity profiles for corresponding electromechanical actuators used to open and close the valves. The current and/or voltage profiles are in turn used to derive appropriate control signals for decreasing the seating velocity. Such techniques, however, are costly and often susceptible to high noise levels and inaccuracies in generated control signals.

Accordingly, the need exists for implementing a more accurate, less expensive method for monitoring and controlling the speed of actuated valves in an internal combustion engine. Such a method is critical for reducing NVH associated with the operation of the camless internal combustion engine.

SUMMARY OF THE INVENTION

The aforedescribed limitations and inadequacies of conventional valve control methods for camless internal combustion engines are substantially overcome by the present invention, in which a primary object is to provide a method and system for controlling valve actuation in a camless internal combustion engine while reducing noise vibration and harshness (NVH).

The above object is achieved by a method for operating one or more valves of a camless internal combustion via electronically controlled valve actuators. The method includes the steps of: measuring noise occurring during valve operation; deriving a control signal based at least in part on the measured noise; and applying the control signal to one or more of the valve actuators to reduce noise attributable to valve operation. The method can be applied to individual intake and exhaust valves of a camless internal combustion engine so as to effect a significant reduction in NVH.

Another preferred method is also provided for operating one or more valves of a camless internal combustion engine, the method including the steps of: determining the occurrence of a valve event; defining a vibration measurement window beginning at a predetermined time prior to the valve event and ending at a predetermined time after the valve event; measuring the vibration of the internal combustion engine attributable to at least one of the valves during the vibration measurement window to generate a vibration measurement signal; deriving an energy content signal from the vibration measurement signal; generating a control signal based at least in part on the energy content signal; and applying the control signal to one or more valve actuators coupled to the valves so as to reduce NVH attributable to the operation of the valves. The method further includes the steps of adjusting the magnitude and duration of the control signal based upon whether or not energy content signal is greater than a predetermined maximum amount or less than a predetermined maximum amount.

An advantage of the above methods is that NVH resulting from the actuation and seating of intake and exhaust valves of a camless internal combustion engine is reduced based on direct measurements of the NVH. Through appropriate processing and analysis of the measured NVH, a corresponding control signal is derived and applied to the valve actuators to generate minimal NVH while ensuring proper opening and closing of the valves. This leads to quieter operation of the engine and diminished wear on valve components.

In accordance with another aspect of the present invention, a valve control system is provided for operating one or more of a camless internal combustion engine. The valve control system includes: at least one valve actuator coupled to the valves; at least one sensor for measuring NVH related to the operation of the valves; and an engine controller coupled to the at least one valve actuator and the at least one sensor for controlling the operation of the internal combustion engine and the valves. The engine controller further determines the time of occurrence of NVH-generating valve events associated with the operation of the valves, processes signals representing the NVH measured by the at least one sensor, and generates a control signal for the at least one valve actuator to reduce the effects of NVH attributable to the operation of the valves, the control signal being based at least in part on the measured NVH.

Still further, in accordance with yet another aspect of the present invention, an article of manufacture is provided for operating of one or more valves of a camless internal combustion engine. The article of manufacture including: a computer usable medium; and a computer readable program code embodied in the computer usable medium for directing the computer to perform the steps of: determining the time of occurrence of NVH-generating valve events associated with the operation of the valves; processing signals representing the NVH measured by the at least one sensor; and generating a control signal for one or more of valve actuators coupled to the valves to reduce the effects of NVH attributable to the operation of the valves, the control signal being based at least in part on the measured NVH.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein.

DETAILED DESCRIPTION OF THE PREFERRED EMBODIMENTS

Figure 1:
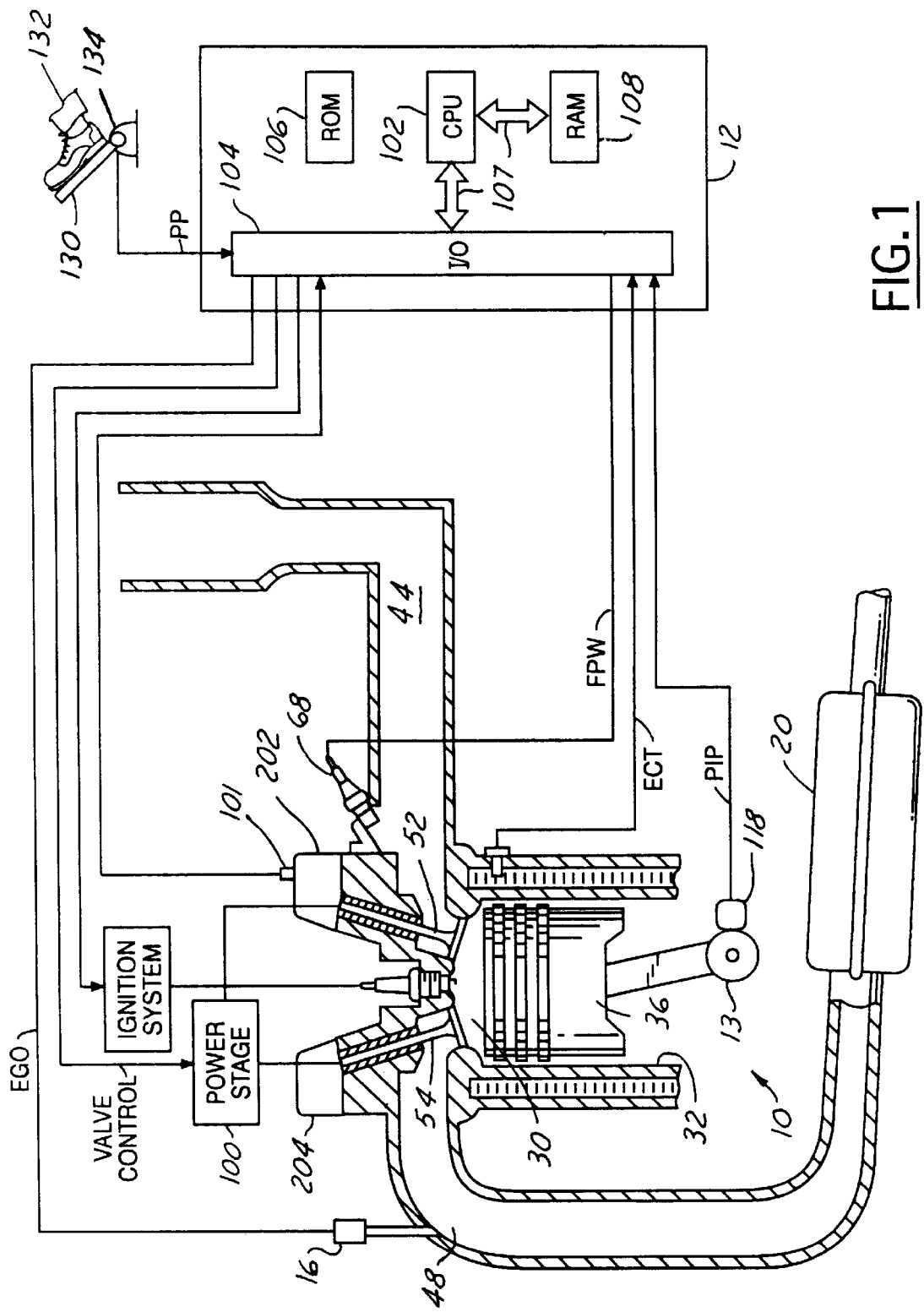
FIG. 1 is a block diagram of a camless internal combustion engine using the valve control method and system of the present invention.

FIG. 1 shows a block diagram of a camless internal combustion engine 10 using a valve control method and system in accordance with the present invention. The engine 10 includes a plurality of cylinders (only one shown) each having a combustion chamber 30 and cylinder walls 32 in cooperation with piston 36 positioned therein and coupled to a crankshaft 13. The combustion chamber 30 communicates with corresponding intake and exhaust manifolds 44 and 48, respectively, via intake and exhaust valves 52 and 54. The intake and exhaust valves 52 and 54 are actuated via corresponding electromechanical or electrohydraulic valve actuators 202 and 204, respectively, each having one or more actuator components as shown and described below with reference to FIG. 2.

As further shown in FIG. 1, a valve control system is provided for opening and closing the intake and exhaust valves 52 and 54 of the camless internal combustion engine 10. The valve control system includes at least one NVH sensor 101 (only one shown) for directly monitoring the NVH generated by the valves 52 and 54, and electronic engine controller 12 coupled to the sensor for controlling the operation of the valves based at least in part on the NVH measured by the sensor. Optionally, individual sensors can be provided for independently monitoring each of electromechanical valves of the camless internal combustion engine 10. The sensor 101, which can be any known and suitable accelerometer, piezoelectric transducer, acoustic microphone or the like, is preferably located near the valve or valves to be monitored.

In accordance with the present invention, the engine controller 12 is coupled to one or more vibration sensors and is used to collect vibration (noise) information related to a noise or NVH-generating event occurring during operation of the engine 10. The terms "noise-generating valve event" and "NVH-generating valve event" refer generally to any valve opening, closing or other intervening events that contribute to undesired NVH associated with the operation of the valves of the camless internal combustion engine. The controller collects vibration information during the valve event, the occurrence of which is determined in advance using a valve schedule derived by the engine controller 12. The engine controller 12 also receives various signals from other sensors coupled to engine 10, the sensors including but not limited to: a temperature sensor 112 coupled to cooling jacket 114 for measuring engine coolant temperature (ECT); a pedal position sensor 134 for providing the accelerator pedal 130 position (PP) as commanded by the driver 132; and an engine position sensor 118 coupled to crankshaft 13 for indicating the operating speed (N) of the camless internal combustion engine. Preferably, the engine controller 12 includes a microprocessor unit 102, input/output ports 104, random access memory (RAM) 108, read-only memory (ROM) 106 and a data bus 107.

Based at least in part on the measured NVH, the engine controller 12 derives one or more calibratable control signals that are applied to one or more of valve actuators 202 and 2040 for reducing NVH attributable to the operation of the valves 52 and 54. Preferably, the engine controller 12 is coupled to a power stage 100 for conditioning control signals as required to actuate the valves. Also, where one sensor is used to monitor more than one valve, the engine position sensor 118 located in close proximity to the crankshaft 13 can be used to determine which valves are being actuated and thus which valve control signal is to be adjusted. Alternatively, the valve actuation timing can be determined solely by the engine controller 12.

Figure 2:
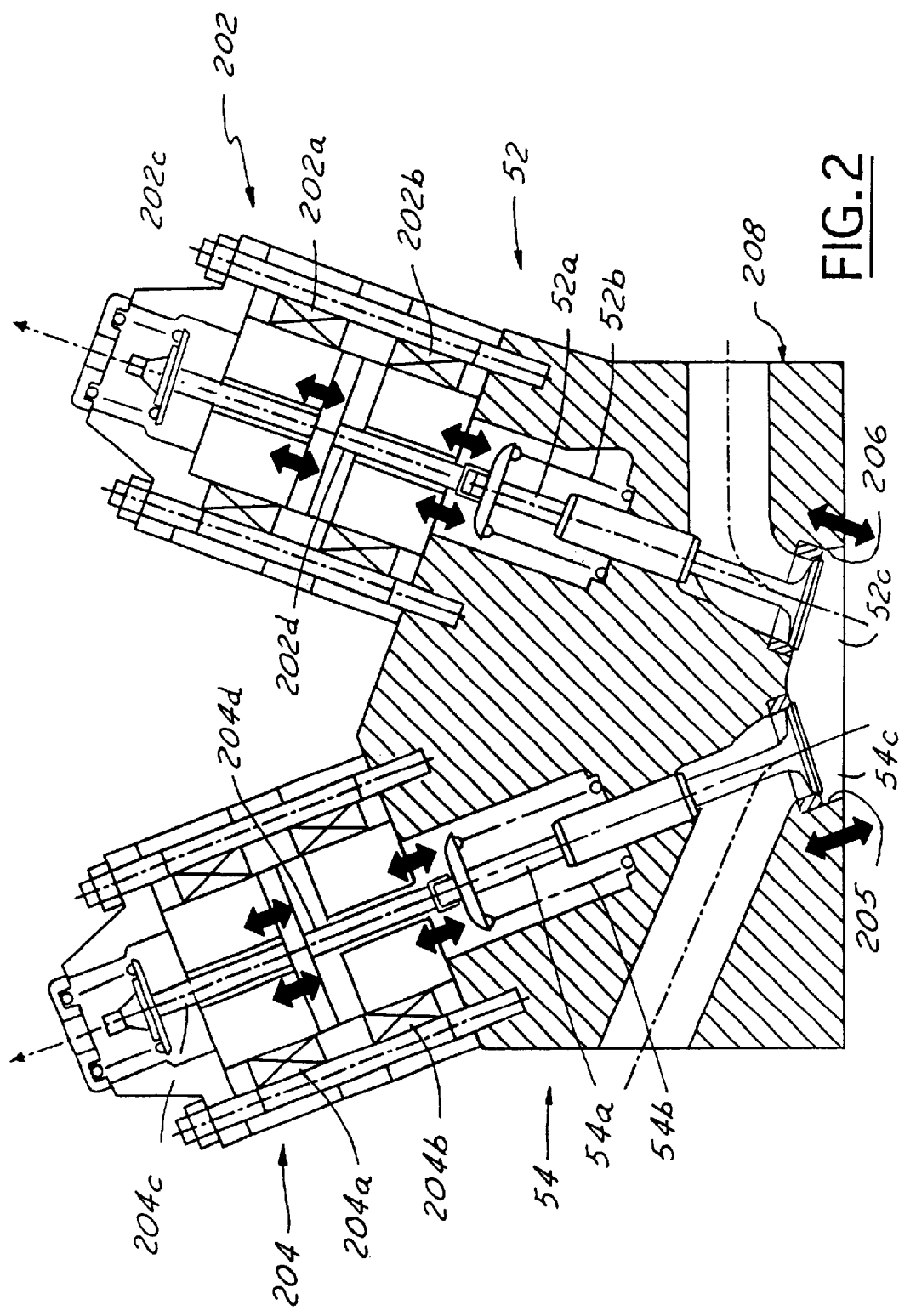
FIG. 2 is a detailed schematic of exemplary electromechanical valves controlled by the valve control method and system of the present invention.

FIG. 2 shows a detailed schematic of the intake and exhaust valves 52 and 54 shown in FIG. 1. The valves 52 and 54, which are shown by way of example and not limitation, include valve stems 52a and 54a, valve springs 52b and 54b, and valve head portions 52c and 54c. The upper portions of the valve stems 52a and 54a are arranged so as to contact the electromechanical actuators 202 and 204, each of which include electromagnetic coils 202a, 204a, 202b and 204b, and actuator components 202c, 204c, 202d and 204d. Depending upon the current (control) signals provided to the actuators 202 and 204, the valves 52 and 54 are actuated into "opened" or "closed" positions relative to corresponding valve seats 205 and 206 disposed on the inside of the cylinder block 208. As the valves 52 and 54 are actuated, noise is produced as a result of the actuator components 202c/204c and 202d/204d contacting each other at the locations indicated by the thick arrows. In addition, noise is produced as the lower actuator components 202d and 204d contact the upper portions of valves 52 and 54, respectively, and as valve head portions 52c and 54c contact corresponding valve seats 205 and 206.

Figure 3:
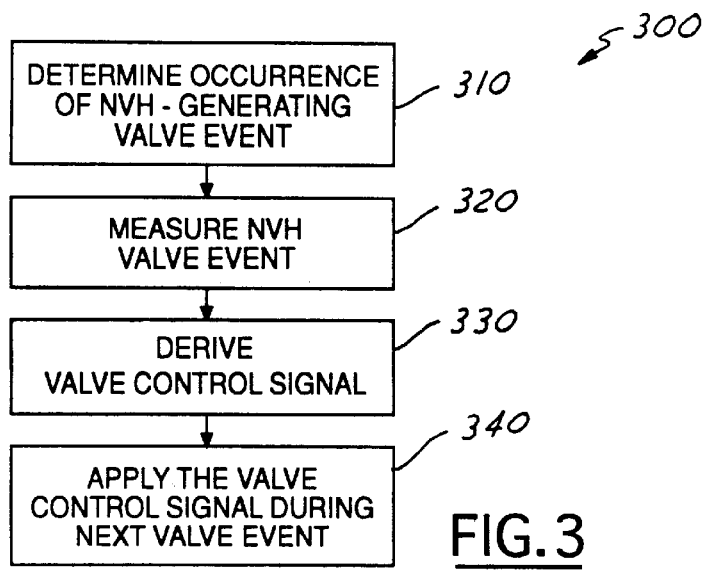
FIG. 3 is a flow diagram of a preferred method for operating the electromechanical valves of FIG. 2 in accordance with the present invention.

FIG. 3 shows a flow diagram of a preferred method of operating one or more electromechanical valves of a camless internal combustion engine via one or more electronically controlled valve actuators. The method includes the steps of: measuring noise, i.e., noise vibration and harshness (NVH), related to valve operation or one or more valve events, step 320; deriving a control signal based at least in part on the measured noise, step 330; and applying the control signal to one or more of the valve actuators coupled to the valves during a subsequent noise-generating event so as to reduce the noise attributable to the operation of the valve, step 340. Preferably, the method includes the additional step of determining the time of occurrence of the noise-generating valve event, step 310, using a valve event schedule of valve opening and closing events. The method of the present invention is further described with reference to FIGS. 4–6.

Figure 7:
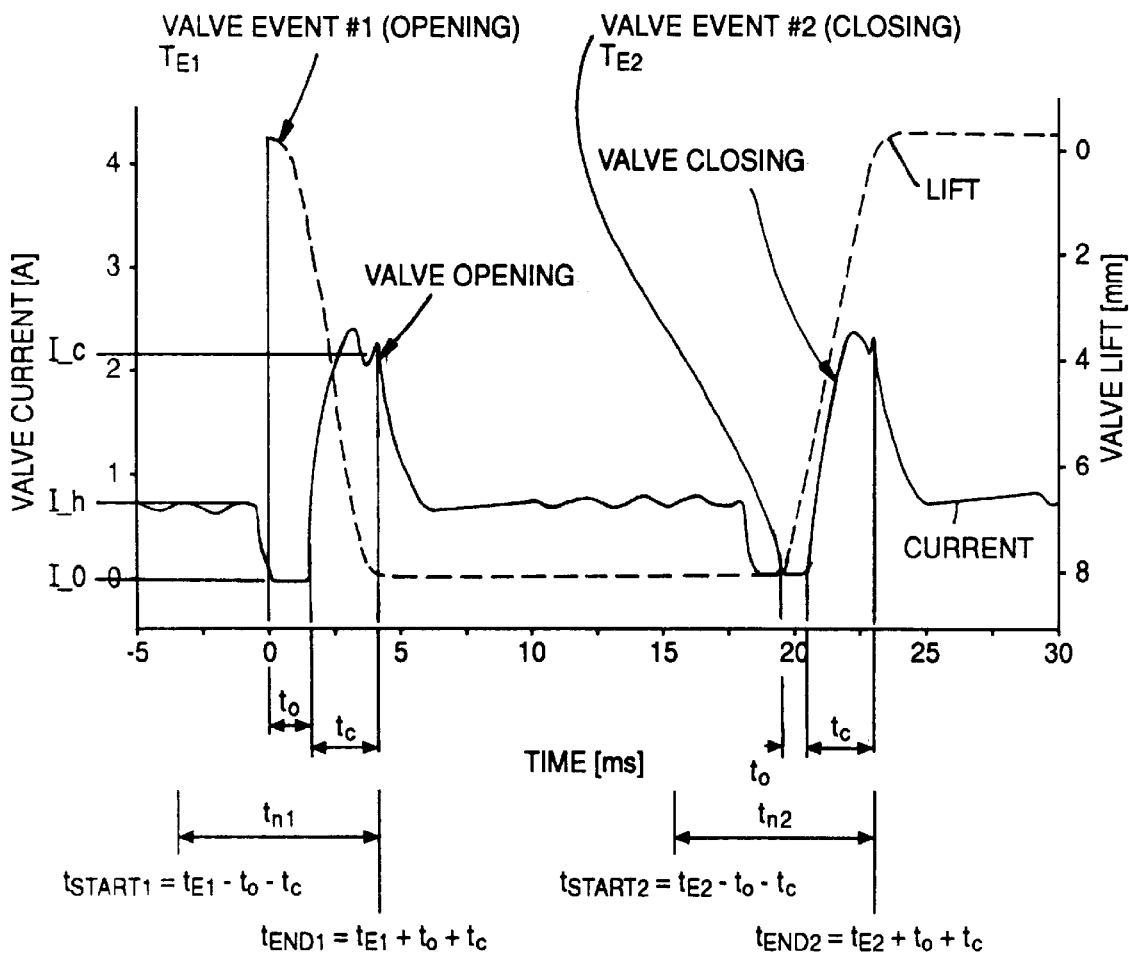
FIG. 7 is a diagram block showing plots of valve control currents and lift profiles for an intake valve similar to the valves shown in FIG. 2 when operated in accordance with the method of FIGS. 4–6.
Figure 4:
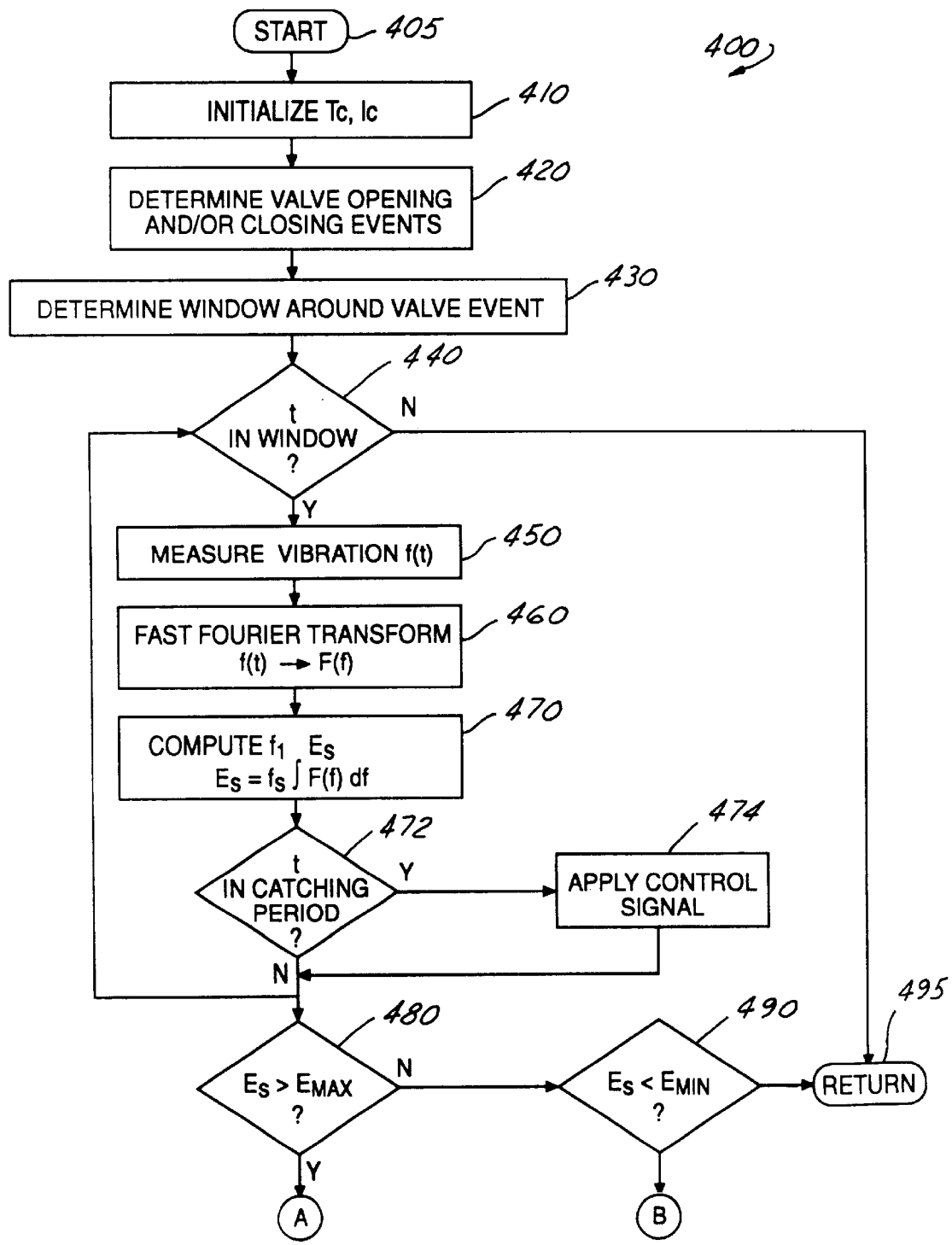
FIGS. 4–6 are flow diagrams showing in detail the preferred method of FIG. 3.
Figure 5:
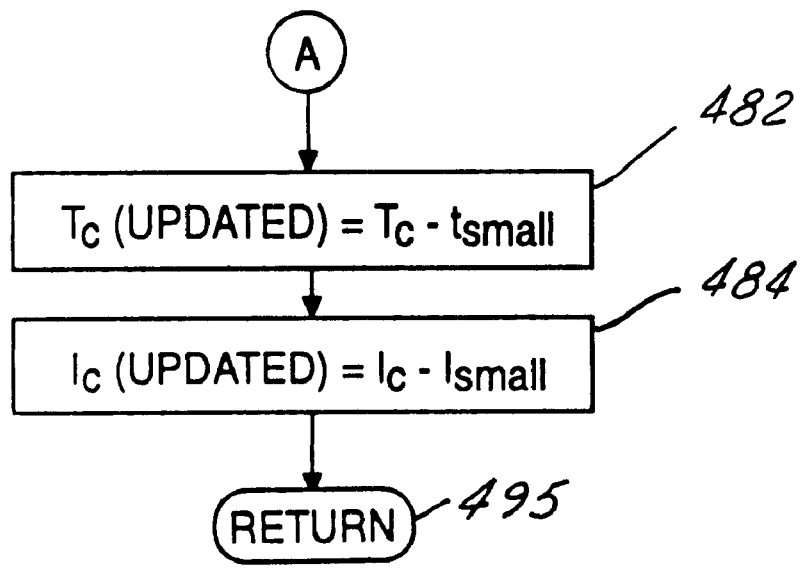
Figure 6:
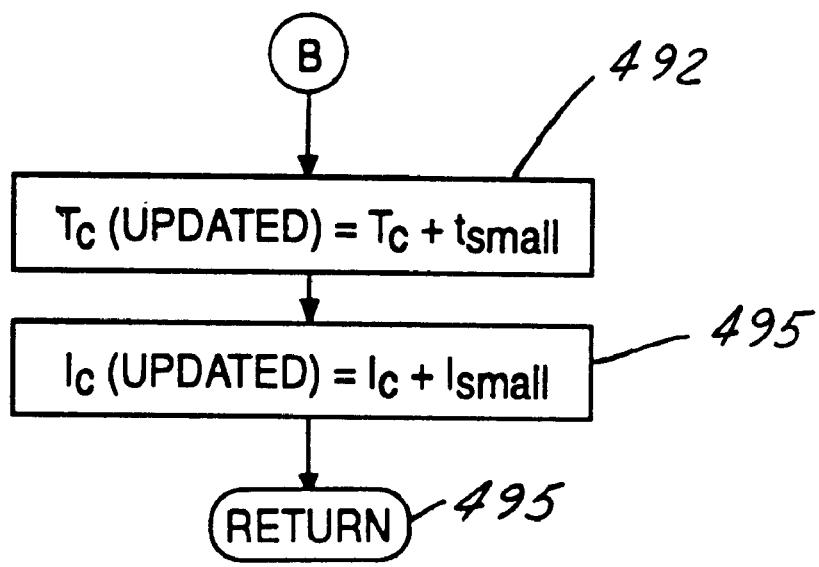

FIGS. 4–6 show a detailed flow diagram of the engine control method of FIG. 3. The method shown corresponds to a control method for operating the electromechanical valves shown in FIG. 2, and is described herein in connection with the operation of only one of such valves of a multi-cylinder camless internal combustion engine. FIG. 7 shows corresponding valve control currents and lift profiles in accordance with the control method of FIGS. 4–6. The left-hand axis in FIG. 7 corresponds to valve current in amps (A), and the right-hand axis corresponds to valve lift in millimeters (mm).

Referring to FIGS. 4–7, the method 400 is used to adjust and apply a control signal to an electromechanical valve. The magnitude or DC value of $I_C$, which is applied for a "catching" period $t_C$, determines the velocity of the valve, e.g., too high a current applied for too long a time might result in too high a seating velocity and therefore unacceptable levels of NVH during valve closing events. Initially, nominal $I_C$ and $t_C$ values are provided via a look-up table stored in an engine controller's ROM and are used to initialize the control method, step 410. The nominal $I_C$ and $t_C$ values are experimentally determined and vary depending on engine operating conditions such as load or speed. After the method is initialized, the values of $I_C$ and $t_C$ are continually updated as described below to reduce NVH caused by the valves. Adjustment of both $I_C$ and $t_C$ is not necessarily required; adjustment of one or both can be performed to satisfy the objectives of the present invention.

In further accordance with the valve current profile of FIG. 7, a "zero" or low level DC current $I_0$ is first applied to a corresponding actuator for a time $t_0$ beginning at the start of each valve event, e.g., valve events occurring at times $t_{E1}$ and $t_{E2}$ as shown in FIG. 7. As shown for example in FIG. 7, the zero current $I_0$ is applied to the actuator as the valve begins to open, and also as it begins to close. The zero current time $t_0$ is determined experimentally and is dependent on engine operating conditions, and can be different for valve opening and closing events. A "catching" current $I_C$ is then applied for a time $t_C$ immediately following $t_0$, and a "holding" current $I_H$ is then applied to the actuator until or just before the beginning of the next valve event.

Referring again to FIGS. 4 and 7, the engine controller next determines the occurrence in time $t_E$ of one or more upcoming valve events using a valve event schedule, step 420. Examples of such valve events are shown in FIG. 7 as valve events 1 and 2 beginning at times $t_{E1}$ and $t_{E2}$, respectively. Valve event 1 is shown as a valve opening, and valve event 2 is shown as the subsequent valve closing. Both valve events produce undesired NVH which is reduced in accordance with the present invention.

A vibration measurement window $t_M$ is then computed about each valve event, step 430, during which NVH measurements are taken and provided to the engine controller. Each measurement window $t_M$, i.e., measurement windows $t_{M1}$ and $t_{M2}$, includes a predetermined start time $t_{start}$ occurring prior to the valve event and a predetermined end time $t_{end}$ occurring after completion of the valve event. In the example shown, the measurement windows $t_{M1}$ and $t_{M2}$ for the corresponding valve events are defined by the intervals $[t_{E1}-t_0-t_C, t_{E1}+t_0+t_C]$ and $[t_{E2}-t_0-t_C, t_{E2}+t_0+t_C]$ corresponding to valve events 1 and 2, respectively. A vibration measurement signal f(t) is generated during the measurement windows $t_{M1}$ and $t_{M2}$ and provided to the engine controller, steps 440 and 450. Otherwise, program control of the valve control method is returned to the engine controller's main control routine, step 495.

As further shown in FIG. 4, the method 400 next includes the step of deriving an energy content signal Es from the vibration measurement signal f(t). This is accomplished by first performing a Fast Fourier Transform of the time-domain signal f(t) to derive a frequency-domain signal F(f), step 460, and then integrating the signal F(f) over the range $f_0$ through $f_1$, step 470. Frequencies $f_0$ are $f_1$ are frequencies of interest that are determined experimentally with respect to undesired NVH frequencies and are stored via look-up tables in the engine controller's ROM. Preferably, frequencies $f_0$ are $f_1$ dependent on the engine operating conditions, such as load or speed, and are used accordingly during execution of the control method 400. At the same time, if within the catching period $t_C$ for the present event, then the valve control signal $I_C$ is applied to the valve actuators for a duration $t_C$ as previously initialized or updated, steps 472 and 474.

After all NVH measurements have been collected and a final energy content signal $E_S$ computed, the final energy content signal $E_S$ is compared to a maximum energy content signal $E_{max}$, step 480. $E_{max}$ is also determined experimentally, and stored in the engine controller's ROM. If $E_S$ exceeds $E_{max}$, as shown in FIG. 5, the "catching" period $t_C$ is reduced by an amount $t_{small}$, step 482, and the "catching" current $I_C$ is reduced by an amount $I_{small}$, step 484. The correction amount tsmall is nominally a fixed value, typically 1% of the nominal $t_C$ value, whereas $I_{small}$ is dependent on engine operating conditions such as load or speed and provided via a look-up table stored in the engine controller's ROM. $I_{small}$ is preferably selected so as reduce the value of the current $I_C$ by approximately 1% of its previous value. Program control is then returned to the engine controller's main control routine, step 495.

If however the energy content signal $E_S$ is less than the maximum energy content signal $E_{max}$, then $E_S$ is compared to a minimum energy content signal $E_{min}$, step 490. If $E_S$ is less than $E_{min}$, then the "catching" period $t_C$ is increased by $t_{small}$, step 492, and the "catching" current $I_C$ is increased by $I_{small}$, step 494. The reason for increasing $t_C$ and $I_C$ is to ensure that the valves are actually "caught," and also to maintain accurate and optimal performance of the electromechanical valves. If the current level is too low and duration too short, then the valves will oscillate to a intermediate position that is neither opened nor closed. Preferably, $t_{small}$ and $I_{small}$ are the same as described above with respect to FIG. 5, but not so limited.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A method of operating one or more valves of a camless internal combustion engine via electronically controlled valve actuators, comprising:

measuring noise, vibration and harshness (NVH) related to valve operation occurring during a predetermined vibration measurement window;

deriving a control signal based at least in part on a Fourier transform representation of the measured NVH and a predetermined range of frequencies representing NVH attributable to valve operation; and applying the control signal to one or more of the valve actuators to reduce NVH attributable to valve operation.

2. The method according to claim 1, further comprising the step of determining the occurrence of NVH-generating valve events.

3. The method according to claim 2, wherein said step of determining the occurrence of NVH-generating valve events comprises:

generating a valve event schedule; and determining the occurrence of valve opening and closing events based upon the valve event schedule.

4. The method according to claim 1, wherein said NVH measuring step comprises:

determining the start and end of an NVH measurement window; and measuring the NVH occurring during the NVH measurement window.

5. The method according to claim 1, wherein said step of deriving the control signal comprises:

deriving an energy content signal from the measured NVH;

comparing the energy content signal to the one or more predetermined limits; and adjusting the control signal based at least in part on said comparison of the energy content signal to the one or more predetermined limits.

6. The method according to claim 5, wherein said predetermined limits comprise a predetermined maximum amount and a predetermined minimum amount, and wherein said adjusting step comprises:

decreasing the magnitude of the control signal when the energy content signal exceeds the predetermined maximum amount; and increasing the magnitude of the control signal when the energy content signal is less than the predetermined minimum amount.

7. The method according to claim 5, wherein said predetermined limits comprise a predetermined maximum amount and a predetermined minimum amount, and wherein said adjusting step comprises:

decreasing the duration of the control signal when the energy content signal exceeds the predetermined maximum amount; and increasing the duration of the control signal when the energy content signal is less than the predetermined minimum amount.

8. A method of operating one or more valves of a camless internal combustion engine via one or more electronically controlled valve actuators, comprising:

determining the occurrence of a valve event;

defining a vibration measurement window beginning at a predetermined time prior to the valve event and ending at a predetermined time after the valve event;

measuring the vibration of the internal combustion attributable to the valves during the vibration measurement window to generate a time-domain signal representation of the vibration;

deriving a Fourier transform representation from the time-domain signal representation;

selecting a predetermined range of frequencies representing undesired vibrations of the internal combustion engine;

deriving an energy content signal based on the Fourier transform representation and the predetermined range of frequencies to generate a frequency-domain representation of vibration over the selected range of frequencies;

comparing the energy content signal to one or more of the predetermined energy content limits; and based on said comparison step, applying a control signal to the one or more valve actuators so as to reduce vibration attributable to the operation of the valves.

9. The method according to claim 8, wherein said step of determining the occurrence of the valve event comprises:

generating a valve event schedule; and determining the occurrence of valve opening and closing events based upon the valve event schedule.

10. The method according to claim 8, wherein said step of deriving the control signal comprises:

decreasing the magnitude of the control signal when the energy content signal exceeds a predetermined maximum amount; and increasing the magnitude of the control signal when the energy content signal is less than a predetermined minimum amount.

11. The method according to claim 8, wherein said step of deriving the control signal comprises:

decreasing the duration of the control signal when the energy content signal exceeds a predetermined maximum amount; and increasing the duration of the control signal when the energy content signal is less than a predetermined minimum amount.

12. A system for operating one or more valves of a camless internal combustion engine, comprising:

at least one valve actuator coupled to the valves;

at least one sensor for measuring noise, vibration and harshness (NVH) related to the operation of the valves occurring during a predetermined vibration measurement window and for generating a time-domain signal representation of the measured NVH; and an engine controller coupled to said at least one valve actuator and said at least one sensor for controlling the operation of the internal combustion engine and the valves, determining the time of occurrence of NVH-generating valve events associated with the operation of the valves, receiving the time-domain signal representation from said sensor, deriving a Fourier transform representation from the time-domain signal representation, providing a predetermined range of frequencies representing NVH attributable to valve operation, deriving an energy content signal based on the Fourier transform representation and predetermined range of frequencies to generate a frequency-domain representation of vibration over the predetermined range of frequencies, comparing the energy content signal to one or more predetermined energy content limits, and based on said comparison step, applying a control signal to the actuators to minimize NVH attributable to valve operation.

13. The system according to claim 12, wherein said engine controller comprises:

a valve event schedule; and means for determining the occurrence of valve opening and closing events based upon the valve event schedule.

14. The system according to claim 12, wherein said engine controller comprises:

means for deriving the energy content signal from the measured NVH;

means for comparing the energy content signal to the one or more predetermined energy content limits; and means for adjusting the control signal based at least in part on the comparison of the energy content signal to the one or more predetermined energy content limits.

15. The system according to claim 14, wherein said predetermined limits comprise a predetermined maximum amount and a predetermined minimum amount, and wherein said adjusting means comprises:

means for decreasing the magnitude of the control signal when the energy content signal exceeds a predetermined maximum amount; and means for increasing the magnitude of the control signal when the energy content signal is less than a predetermined minimum amount.

16. The system according to claim 14, wherein said predetermined limits comprise a predetermined maximum amount and a predetermined minimum amount, and wherein said adjusting means comprises:

means for decreasing the duration of the control signal when the energy content signal exceeds a predetermined maximum amount; and means for increasing the duration of the control signal when the energy content signal is less than a predetermined minimum amount.

17. The system according to claim 12, further comprising a sensor coupled to said engine controller for providing crankshaft position information to said engine controller.

18. The system according to claim 13, further comprising a power stage coupled to said engine controller for conditioning the valve control signals to be provided to the valves.

19. An article of manufacture for operating of one or more valves of a camless internal combustion engine, comprising:

a computer usable medium; and a computer readable program code embodied in said computer usable medium for directing the computer to perform the steps of: determining the time of occurrence of NVH-generating valve events associated with the operation of the valves, processing time-domain signals representing the NVH measured by said at least one sensor during a predetermined vibration measurement window, deriving a Fourier transform representation from the time-domain signals, providing a predetermined range of frequencies representing NVH attributable to valve operation, deriving an energy content signal based on the Fourier transform representation and predetermined range of frequencies to generate a frequency-domain representation of vibration over the selected range of frequencies, comparing the energy content signal to one or more predetermined energy content limits, and based on said comparison step, deriving a control signal for the actuators to minimize NVH attributable to valve operation.

20. A method of operating one or more valves of a camless internal combustion engine via at least one electronically controlled valve actuator, comprising:

generating a time-domain signal representation of noise, vibration and harshness (NVH) related to valve operation occurring during a predetermined NVH measurement window;

deriving a Fourier transform representation from the time-domain signal representation;

selecting a predetermined range of frequencies representing NVH attributable to valve operation;

deriving an energy content signal based on the Fourier transform representation and the predetermined range of frequencies to generate a frequency-domain representation of vibration over the selected range of frequencies;

comparing the energy content signal to one or more predetermined energy content limits; and based on said comparison step, applying a control signal to the actuator to minimize NVH attributable to valve operation.

21. The method according to claim 20, further comprising the steps of:

determining the occurrence of a valve event;

determining the start and end of the NVH measurement window in relation to the valve event; and measuring NVH occurring during the NVH measurement window;

and further wherein said step of applying a control signal comprises the steps of:

applying a holding current to the actuator before the valve event;

applying a catching current during at least a portion of the NVH measurement window; and adjusting the catching current based on said comparison of the energy content signal to the one or more predetermined limits.

22. The method according to claim 21, wherein said step of adjusting the catching current comprises:

decreasing the magnitude of the catching current when the energy content signal exceeds a predetermined maximum amount; and increasing the magnitude of the catching current when the energy content signal is less than a predetermined minimum amount.

23. The method according to claim 21, wherein said step of adjusting the catching current comprises:

decreasing the duration of the catching current when the energy content signal exceeds a predetermined maximum amount; and increasing the duration of the catching current when the energy content signal is less than a predetermined minimum amount.

* * * * *